March 24, 1959  H. MULCH  2,878,604
SLIDE CHANGER
Filed Nov. 28, 1956  3 Sheets-Sheet 2
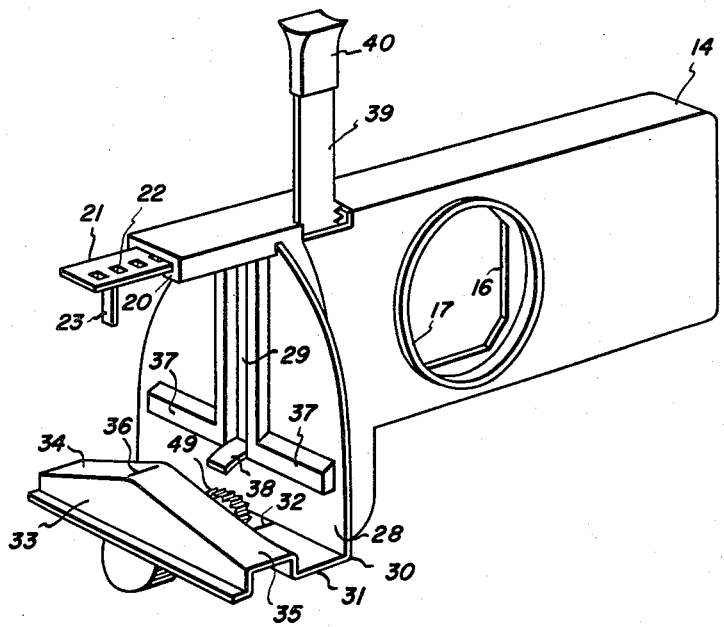
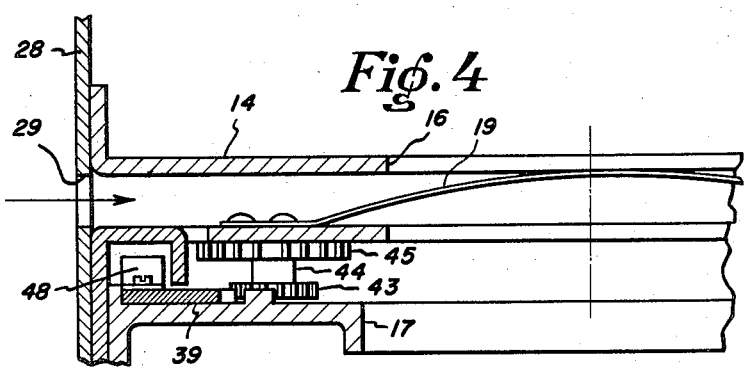
INVENTOR.
HANS MULCH
BY
ATTORNEYS March 24, 1959 H. MULCH 2,878,604
SLIDE CHANGER
Filed Nov. 28, 1956 3 Sheets-Sheet 3

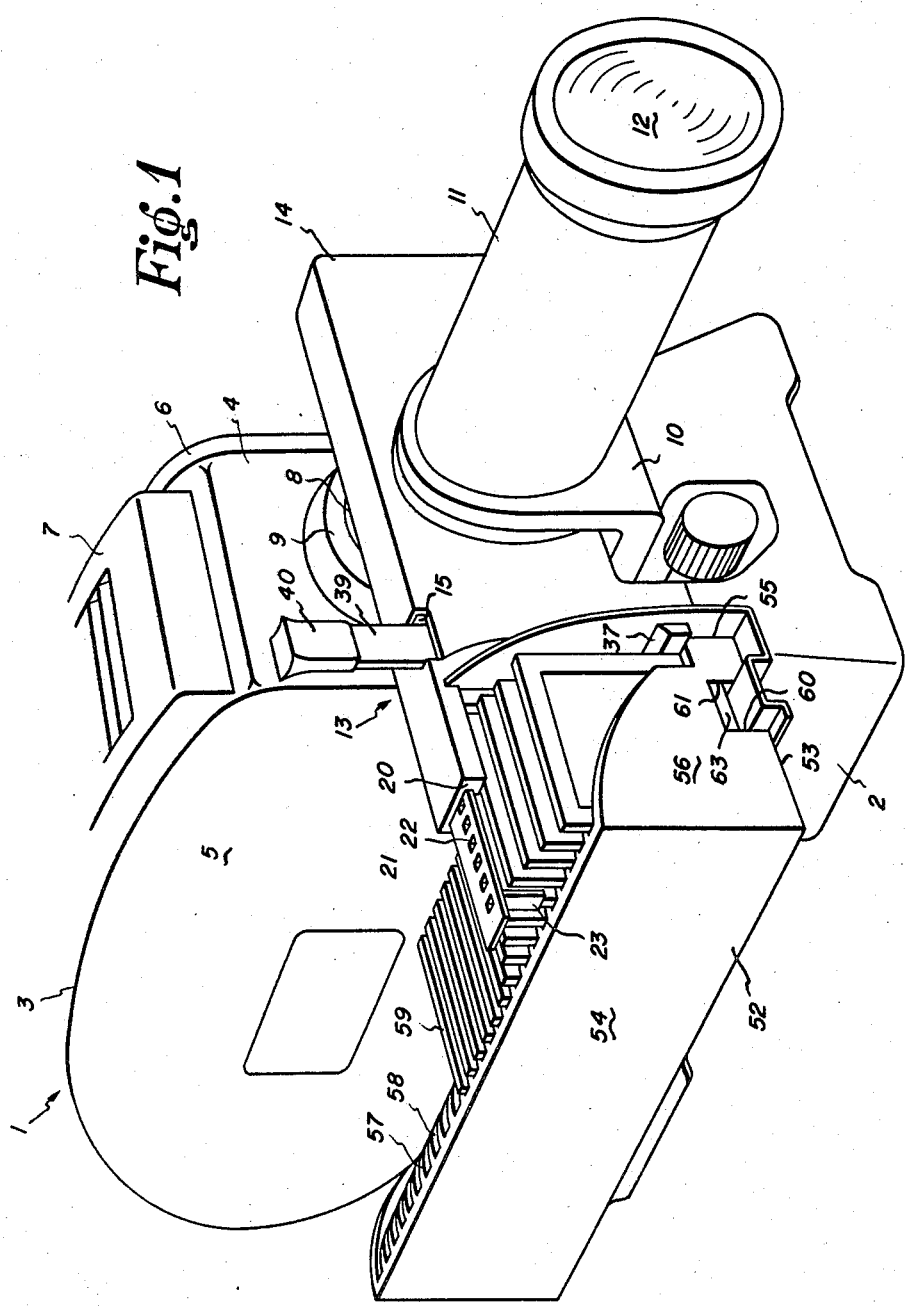

INVENTOR.
HANS MULCH
BY Taulmin & Taulmin
Attorneys

United States Patent Office 2,878,604
Patented Mar. 24, 1959

2,878,604

SLIDE CHANGER

Hans Mulch, Wetzlar (Lahn), Germany, assignor to Ernst Leitz, G.m.b.H., Optische Werke, Wetzlar (Lahn), Germany Application November 28, 1956, Serial No. 631,389

Claims priority, application Germany November 28, 1955

10 Claims. (Cl. 40—79)

The present invention relates to a semi-automatic projector for slides or transparencies, more particularly, to a slide changer actuated by a manually operable handle which causes the removal of a slide from the magazine, return of the slide to the magazine, and advancing of the magazine a distance equal to the space between adjacent slides to position the succeeding slide with respect to the slide changer mechanism.

It is the principal object of this invention to provide a novel and improved slide changer mechanism for a slide projector.

It is another object of this invention to provide a simple and dependable mechanism for operating the slide changer of a slide projector.

It is a further object of this invention to provide a semi-automatic slide changer which is actuated by a conveniently located operating plunger.

It is an additional object of this invention to provide a semi-automatic slide changer wherein the vertical movement of a manually operated plunger will remove a slide from a magazine, return the slide to the magazine, and advance the magazine to align the succeeding slide with the slide changer mechanism.

It is still another object of this invention to provide a semi-automatic slide changer actuated by a manually operated plunger which is located on the projector so as not to interfere with the operation of the projector but is convenient and easily accessible to the operator.

Other objects and advantages of this invention will become apparent upon reference to the accompanying description when taken in conjunction with the following drawings wherein:

Figure 1 is an overall perspective view of a slide projector having a slide changer in accordance with this invention with a portion of the base of the projector removed;

Figure 2 is an overall perspective view of the slide changer mechanism per se;

Figure 4 is a sectional view taken along the lines 4—4 of Figure 3 to illustrate the relationship of the operating plunger with the gear mechanism for operating the slide changer;

Figure 3:
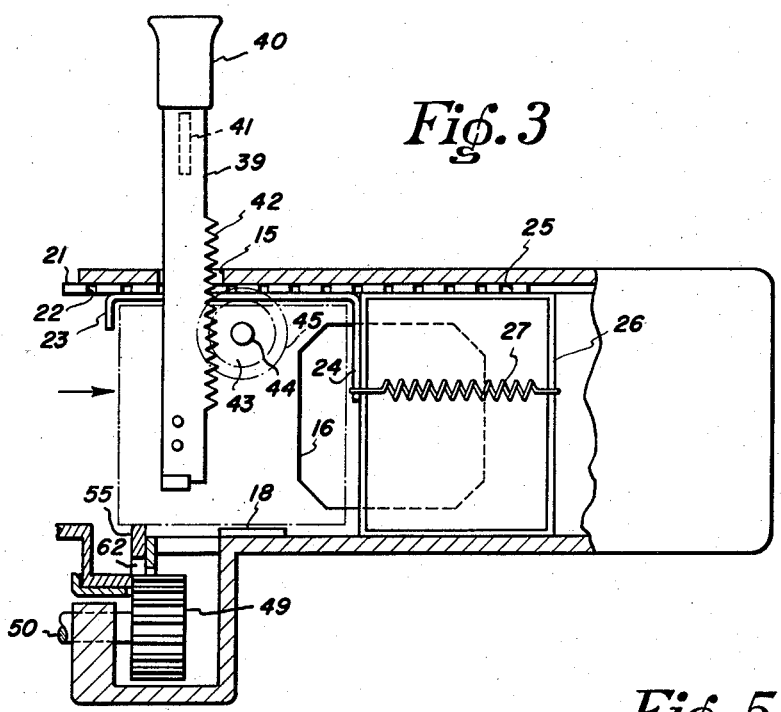
Figure 3 is a sectional view taken along the lines 3—3 of Figure 2 to show details of the slide changer mechanism.

This invention essentially comprises a slide changer which is positioned on the front of a slide projector and including a magazine support on one side of the projector. The magazine support has a cam with inclined surfaces which is received in a longitudinal groove extending along the bottom of a magazine slidably mounted on the magazine support. The action of the inclined faces of the cam gradually raises the slides in the magazine to enable each individual slide to clear the shorter side wall of the magazine when that particular slide is aligned with the slide changer mechanism. The slide changer mechanism is actuated through a rack and gear system by a manually operated vertical plunger. Upward movement of the plunger causes the slide changer to remove a slide from the magazine and to position the same in projecting position in the projector. Subsequent downward movement of the operating plunger results in returning the slide to the magazine and will advance the magazine so as to align the succeeding slide with the slide changer mechanism.

In a modification of the slide changer mechanism, a rack is slidably mounted on the plunger and is in constant mesh with the gear system which interconnects the operating plunger with the slide changer. With this structure, movement of the slide changer mechanism is stopped when the slide is returned to its proper position in the magazine but the continuing downward movement of the operating plunger actuates the step-by-step mechanism to advance the magazine a distance equal to the distance between two adjacent slides in the magazine.

Returning now to the drawings and more particularly to Figure 1, wherein like symbols indicate the same parts of the various views, 1 indicates generally the slide projector of this invention. The projector 1 comprises a base 2 upon which is mounted a body 3 which encloses a source of light. The body 3 comprises a front wall 4, side walls 5 and 6 and a top 7. The front wall 4 has an opening 8 which is surrounded by a raised rim 9. Extending outwardly from the front wall and from below the raised rim 9 is an angular supporting arm 10 upon which is mounted a lens housing 11 at the end of which is an objective lens 12.

A slide changer mechanism indicated generally at 13 is positioned between the front wall 4 and the supporting arm 10 of the slide projector and extends laterally beyond the side wall 5 of the slide projector. The slide changer comprises a housing 14 which has an opening 15 in the top thereof. In the front and rear walls of the housing there are aligned openings 16 and 17 which are also aligned with the opening 8 in the front wall of the projector. Guides 18 are mounted upon the inner bottom surface of the slide changer housing 14 to guide the slide into projecting position between the openings 16 and 17. There is a leaf spring 19 within the slide changer housing, which may be seen in Figure 4, to secure the slide against movement in the projecting position between the openings 16 and 17.

Adjacent the inner surface of the top of the slide exchanger housing 14 there is formed a guide 20 which slidably supports a rack 21 which has a series of holes 22 therein and adjacent the outer end thereof has spaced gripping arms 23 and 24. The gripping arms are spaced apart the width of the slides which are accommodated in the magazine. There is a slot 25 in the longitudinal edge of the rack adjacent the operating plunger.

An opaque screen 26 is secured to the longer gripping arm 24 by a spring 27. The opaque screen prevents the light from shining uninterrupted from the projector body during changes of the slides. Since the opaque screen moves in conjunction with the changer mechanism, the screen is interposed in the path of the projector light whenever an individual slide is being removed from the magazine or being returned thereto.

The end of the slide changer housing which is adjacent the slide magazine is closed off by an end plate 28 which has a vertically extending slot 29 therein which is aligned with the guides 18. The slot is of sufficient dimensions to readily accommodate a vertically upstanding slide therethrough. The end plate 28 is bent at right angles at 30 to form a magazine support frame 31. There is a rectangular opening 32 in the bend 30 to accommodate a gear in a manner to be explained later.

A cam 33 is stamped into the upper surface of the magazine support frame to form two sloping surfaces 34 and 35 which intersect to form a prominence or high point 36 which is aligned with the vertical slot 29 in the end plate of the slide changer.

A pair of guide rails 37 are fastened to the outer surface of the end plate 28 and are spaced above the magazine support frame a distance equal to the height of the shorter side wall of the magazine. A guide piece 38 extends outwardly between the rails 37 to facilitate the entry of the slides into the vertical slot 29.

Extending upwardly through the opening 15 of the slide changer housing is an operating plunger 39 which has a handle 40. One face of the plunger has a gib 41 which is formed to be closely received within the slot 25 in the rack 21.

One edge of the plunger has a toothed rack 42. The rack 42 meshes with a gear 43 which is fixed upon one end of a shaft 44. The shaft 44 is journaled in the slide changer housing and has a second gear 45 fixed on the other end thereof. The gear 45 meshes with the holes 22 of the rack 21. Each of the gears 43 and 45 have a different number of teeth so as to require a shorter vertical movement of the operating plunger to operate the slide changer mechanism.

The lower end of the operating plunger indicated at 46 carries a leaf spring 47 which has a bend 48 therein. The bent portion of the leaf spring engages a step gear 49 which is fixed upon a shaft 50 journaled in the lower portion of the slide changer housing 14. As may be clearly seen in Figure 3, a portion of the periphery of the step gear 49 projects through the opening 32 in the slide changer housing end plate. Although not shown, a rotary gear handle may be affixed to the outer end of the shaft 50 to permit manual advancement of the magazine.

Figures 5, 6:
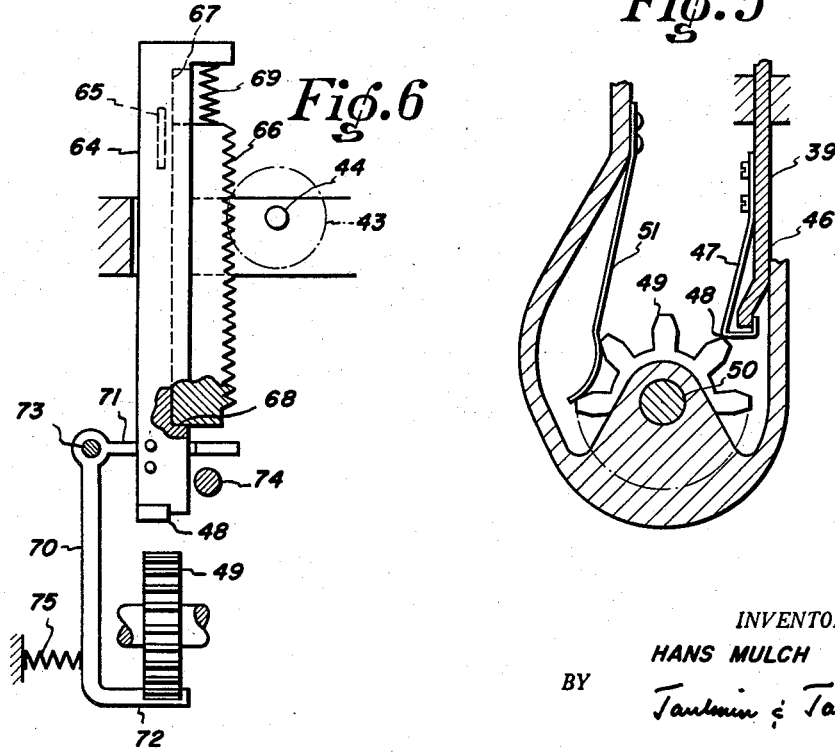
Figure 5 is a sectional view taken along the lines 5—5 of Figure 3 but showing the plunger in a lower position with the lower portion of the plunger in contact with the step gear.
Figure 6 is a portion of a view similar to Figure 3 and showing a modification of the operating plunger.

A stop spring 51 is mounted to engage the teeth on the step gear 49 as shown in Figure 5 to maintain the step gear in position when the lower end of the operating plunger is disengaged therefrom. The stop spring also assures that the step gear will advance one tooth at a time so as to successively align the slides of the magazine with the slide changer mechanism.

Slidably mounted upon the magazine support frame 31 is a magazine 52 which comprises a bottom 53, side walls 54 and 55 and end walls 56. The side wall 55 which is adjacent the slide projector is considerably shorter in height than the side wall 54 which is away from the projector. The height of the shorter side wall 55 is equal to that of the height of the prominence 36 on the magazine supporting frame cam 33. Also, the top edge of the side wall 55 slidably engages the bottom edges of the guide rails 37. Spaced throughout the length of the magazine is a series of transversely extending partitions 57 which form a series of compartments 58 each of which accommodates an individual slide or transparency 59. The bottom 53 of the magazine has a longitudinally extending groove 60 which extends upwardly into the partitions at 61 and which is illustrated in Figure 5. The height of the groove formed by the slots 60 and 61 is again equal to the height of the prominence 36 on the magazine supporting frame cam and the height of the shorter side wall 55 above the surface of the magazine supporting frame.

The lower edge of the magazine side wall 55 has a rack 62 which engages the step gear 49 to advance the magazine in a manner to be presently described.

With the structure of the slide changer and projector in mind, the operation of the mechanism will next be described.

When the magazine 52 is advanced upon the magazine supporting frame 31, the individual slides will gradually be raised by the action of the inclined cam 34 on the bottoms of the slides in the magazine. As may be seen in Figure 1, the bottom of the slides as indicated at 63 projects downwardly beyond the upper edge of the groove 61.

When the slide is positioned upon the prominence 36 of the cam, it is aligned with the vertical slot 29 and the guides 18 of the slide changer housing. The operating plunger 39 is then moved upwardly to rotate the gears 43 and 45 in the direction to move the rack 21 inwardly. Since the gripping arms 23 and 24 are positioned on each side of the slide, as may be seen in Figures 1 and 3, the slide also will be moved laterally of the magazine over the shorter side wall 55 through the vertically extending slot 29 and into the slide changer housing where it is positioned between the openings 16 and 17 and held in place by the leaf spring 19. After the slide has been projected upon a screen in the conventional manner, and the viewing thereof has been completed, the operating plunger 39 is then moved downwardly. This downward vertical movement of the plunger will rotate the gears 43 and 45 in a reverse direction to move the rack 21 outwardly of the slide changer housing and to return the slide to its position in the magazine. The slide will be returned to the magazine before the operating plunger reaches the limit of its downward movement. At this point the gib 41 on the operating plunger will engage the slot 25 on the rack and further movement of the rack is prevented during the further downward movement of the operating plunger. The continued downward movement of the operating plunger will cause the lower end of the plunger to engage the step gear 49 which is in mesh with the rack 62 on the magazine. The step gear will rotate sufficiently to advance the magazine a distance equal to the distance between two slides and to align the succeeding slide between the gripping arms 23 and 24 of the slide changer rack 21. The slide changing mechanism is now in position to repeat its movement to position the succeeding slide and housing.

Proceeding next to Figure 6, there is illustrated a modified plunger structure wherein the rack on the plunger is in constant mesh with the gears but further downward movement of the plunger is permitted. This modification comprises a plunger 64, which has a gib 65 on one face thereof to engage the slot 25 in the rack 21. A toothed rack 66 is slidably mounted in a groove or guide 67 on one edge of the operating plunger 64. The lower end of the guide forms an abutment 68. A spring 69 urges the rack 66 downwardly against the abutment 68. The rack 66 engages the gear 43 in a manner as previously described.

This modification also includes a locking mechanism for the step gear which comprises a U-shaped member 70 which has legs 71 and 72 and is pivotally mounted at 73. The leg 71 is engageable by the lower end of the rack 66 and its movement is limited by a stop 74 positioned therebelow. The other leg 72 engages the teeth of the step gear as illustrated in Figure 6 and is maintained in this position by a spring 75 which is weaker than the spring 69 bearing against the slidably mounted plunger rack 66.

The advantage of this modification is that the rack is in engagement with the gear at all times but that further downward movement of the plunger is permitted in order to actuate the mechanism to advance the magazine. Consequently, a separate safety device for securing the position of the rack and of the slide changer mechanism, respectively, is unnecessary.

When the slide changer mechanism embodying the modified plunger mechanism illustrated in Figure 6 is operated, the downward movement of the plunger will result in rotation of the gears 43 and 45 in the manner previously described to move the rack 21 outwardly. When the outward movement of the rack has been sufficient to position the slide in its original place in the magazine, the slot 25 in the edge of the rack is engaged by the gib 65 on the plunger and consequently any movement of the slide retained between the gripping arms of the rack is prevented.

Further downward movement of the plunger results in the lower end of the rack 66 engaging the leg 71. The U-shaped member 70 is then pivoted until the leg 71 engages the abutment 74. At this point the lower leg 72 is disengaged from the step gear 49 and the bent portion 48 of the spring on the lower end 46 of the operating plunger engages a tooth of the step gear in the manner shown in Figure 5 to rotate the step gear sufficiently to advance the magazine a distance equal to the distance between two slides. Since the spring 75 is weaker than the spring 69, binding is prevented between the rack 66 and gear 43 during the time that the rack is engaging the leg 71 of the U-shaped member to disengage the step gear locking mechanism.

Thus, it can be seen that the present invention discloses a slide projector having a semi-automatic slide changer mechanism wherein the operating handle for the slide changer mechanism is placed in a readily accessible and convenient position but does not interfere in any way with the operation of the projector. This is basically accomplished by utilizing a vertically movable operating plunger the movement of which is vertical with respect to the movement of the slides from the magazine to the projector and also vertical with respect to the movement of the magazine. The rack and gear mechanism which translates the movement of the operating plunger to movement of the slide changing mechanism is extremely simple, easy to construct, and requires a minimum of maintenance care. In addition, a modification is disclosed which locks both the slide changer and the magazine aginst accidental movement but which automatically permits both of these components to move at their proper sequence in the cycle of operation of the slide changer mechanism.

It will be understood that this invention is susceptible to modification in order to adapt it to different usages and conditions, and, accordingly, it is desired to comprehend such modifications within this invention as may fall within the scope of the appended claims.

What is claimed is:

1. In a slide changer for a slide projector; a supporting frame on one side of said projector; a magazine for storing slides slidably mounted on said supporting frame; said magazine having side walls for retaining said slides against lateral movement; a frame on the front of said projector and extending laterally over said magazine; a rack slidably mounted on said frame; gripping arms on said rack for gripping the upper portion of an individual slide; gear means engaging said rack; and a vertically extending plunger for actuating said gear means to move said rack, and a slide retained between said gripping arms into position on said projector and for returning said rack, arms, and slide to position in the magazine.

2. In a slide changer as claimed in claim 1 with a second rack mounted on said plunger for engaging said gear means to move said first-mentioned rack.

3. In a slide projector, a magazine supporting frame on one side of the projector, a magazine slidably mounted on said supporting frame and retaining a plurality of slides therein, a housing mounted on the front of said projector with a portion thereof extending laterally outwardly over said magazine, a first rack slidably mounted on said projecting portion, gripping arms adjacent the outer edge of said rack for engaging the upper portions of slides retained in said magazine, a shaft journaled within said housing, a first gear fixed on said shaft and meshing with said rack, a second gear fixed on said shaft, a manually operated plunger movably mounted in a vertical position on said housing for operating said slide changing means, there being a second rack on said plunger for engaging said second gear whereby the vertical movement of said plunger is transmitted through said gears to said slide changing first rack.

4. In a slide projector as claimed in claim 3 with said first and second gears each having a different number of teeth.

5. In a slide projector, a magazine supporting frame on one side of the projector, a magazine for storing slides slidably mounted upon said supporting frame, slide changer means for moving said slides transversely from said magazine into viewing position on said projector and returning said slides to the magazine, said slide changer comprising a slidably mounted rack therein for singly gripping said slides and moving the same into viewing position in the projector, a vertically movable plunger for actuating said slidable rack, a projecting rib on said plunger, there being a notch in said rack engageable with said plunger projecting rib when said rack has returned a slide to its position in the magazine whereby further movement of the rack is prevented during additional movement of the plunger.

6. In a slide projector, a magazine supporting frame on one side of the projector, a magazine for storing slides and slidably mounted on said supporting frame, a housing for a slide changer mechanism adjacent the front wall of said projector with a portion of said housing extending laterally over said magazine, a first rack slidably mounted on the laterally extending portion of said housing a shaft journalled in said housing, a first gear affixed to said shaft and in mesh with said rack, a second gear affixed to said shaft, a vertical plunger slidably mounted in said housing, a second rack slidably mounted on said plunger, and spring means urging said second rack downwardly on said plunger.

7. In a slide projector, a magazine supporting frame on one side of the projector, a magazine slidably mounted on said supporting frame, a frame on the front wall of said projector and extending laterally over said magazine, a first rack slidably mounted in said frame, a shaft journalled in said frame, a first gear mounted on said shaft and engaging said rack, a second gear mounted on said shaft, a vertical plunger manually operated for moving said first rack through said gear means, a second rack slidably mounted on said vertical plunger, spring means urging said second rack downwardly on said plunger, means actuated by the lower end of said vertical plunger for advancing said magazine to position succeeding slides for removal to the viewing position on said projector, means for locking said advancing means against movement, said locking means being unlocked by contact with the second rack mounted on the plunger, means for stopping the movement of said second rack, said vertical plunger continuing its downward movement due to the spring means urging the rack downwardly to engage said magazine advancing means to advance the magazine the distance between two slides.

8. In a slide changer for a slide projector; a supporting frame on one side of said projector; a magazine for storing slides and slidably mounted on said supporting frame; said magazine having side walls for retaining said slides against lateral movement with the height of the side wall adjacent the projector being substantially less than the height of the slide; means on said magazine support for raising at least one of the slides in said magazine whereby the bottom edge of the slide is level with the top edge of said shorter side wall; a frame on the front of said projector and extending laterally over said magazine; a rack slidably mounted on said frame; gripping arms on said rack for gripping the upper portion of a slide, gear means for engaging said rack; a vertically extending plunger for actuating said gear means to move said rack, gripping arms and said slide into position in said projector and for returning said rack, arms and slide to position the slide in the magazine.

9. In a slide changer for a slide projector; a supporting frame on one side of said projector; a magazine for storing slides slidably mounted on said supporting frame; said magazine having side walls for retaining said slides against lateral movement; there being a toothed rack on the lower edge of said magazine adjacent said one side of said projector; a frame on the front of said projector and extending laterally over said magazine; a rack slidably mounted on said frame; gripping arms on said rack for gripping the upper portion of an individual slide; gear means engaging said rack; a vertically extending plunger for actuating said gear means to move said rack and a slide retained between said gripping arms into position on said projector and for returning said rack, arms, and slide to position in the magazine; and a gear in mesh with the rack on the lower edge of said magazine and engageable by the lower portion of said plunger during its downward movement to advance said magazine the distance of two slides to position the succeeding slide where it may be removed by said gripping arms into position on said projector.

10. In a slide projector, a magazine supporting frame on one side of the projector, a magazine slidably mounted on said supporting frame, there being a toothed rack on the lower edge of said magazine adjacent said one side of said projector, a frame on the front wall of said projector and extending laterally over said magazine, a first rack slidably mounted in said frame, a shaft journalled in said frame, a first gear mounted on said shaft and engaging said rack, a second gear mounted on said shaft, a vertical plunger manually operated for moving said first rack through said gear means, a second rack slidably mounted on said vertical plunger, spring means urging said second rack downwardly on said plunger, means engageable with said magazine toothed rack and actuated by the lower end of said vertical plunger for advancing said magazine to position succeeding slides for removal to the viewing position on said projector, means for locking said advancing means against movement, said locking means being unlocked by contact with the second rack mounted on the plunger, means for stopping the movement of said second rack, said vertical plunger continuing its downward movement due to the spring means urging the rack downwardly to engage said magazine advancing means to advance the magazine the distance between two slides.

References Cited in the file of this patent

UNITED STATES PATENTS

| | | |
|---|---|---|
| 643,894 | Furdek | Feb. 20, 1900 |
| 2,711,602 | Wiklund | June 28, 1955 |
| 2,724,989 | Badalich | Nov. 29, 1955 |
| 2,732,758 | Waller | Jan. 31, 1956 |